United States Patent Office 3,123,507
Patented Mar. 3, 1964

3,123,507
GAS-GENERATING COMPOSITIONS
Philip G. Butts, East Alton, Ill., and Carl R. Fingerhood, University City, Mo., assignors to Olin Mathieson Chemical Corporation, East Alton, Ill., a corporation of Virginia
No Drawing. Filed Nov. 22, 1957, Ser. No. 698,057
8 Claims. (Cl. 149—19)

This invention relates to combustible explosive charges and particularly to ammonium nitrate gas-generating compositions.

Gas-generating charges are normally used for the actuation of pressure operated mechanical devices of various types, including rockets. Ammonium nitrate compositions have been used quite extensively for this purpose and the ammonium nitrate is in all cases provided with various types of modifiers in efforts to enhance its utility for the operation of various types of gas-generator mechanisms. Although a number of such materials are now in use, their efficiency and adaptability are limited by a number of inherent faults. Such compositions would ideally have low flame temperatures, little or no smoke evolution, and be readily ignitable over a wide range of temperatures, yielding gaseous, non-erosive combustion products. In addition, they should be stable at elevated temperatures and capable of being subjected to sharp temperature changes without altering the characteristics of the composition. Also, such gas-generating charges must have sufficient physical strength to withstand normal handling in the field. While some of these goals have been attained by the gas-generating charges now in current usage, no single combustible charge meeting all of these requirements has heretofore been developed.

It is, therefore, an object of this invention to provide gas-generating compositions overcoming the disadvantaages of the prior art. It is also an object of this invention to provide new and novel ammonium nitrate gas-generating compositions. It is a further object of this invention to provide ammonium nitrate gas-generating compositions having improved characteristics.

In accordance with this invention, these and other objects are achieved generally speaking by providing a consolidated gas generating charge containing ammonium nitrate in intimate mixture with a rubber binder and a ballistic modifier. It has also been found that inclusion in the composition of an ammonium nitrate decomposition catalyst and in particular, sodium barbiturate, greatly improves the composition. More specifically, this invention contemplates such a gas-generating charge containing between about 70% and about 80% ammonium nitrate, between about 12% and about 18% binder, between about 2% and about 10% ballistic modifier, and between about 1% and about 3% sodium barbiturate. These proportions are used to indicate parts by weight. This invention also contemplates such compositions containing carbon black and a coolant such as ammonium oxalate, ammonium nitrite, oxalic acid, oxamide, and the like. It has been found that the addition of carbon black to the composition enhances the catalytic influence of the sodium barbiturate and that materials such as ammonium oxalate assist materially in reducing the temperature of the gases evolved upon combustion of the composition.

Ammonium nitrate compositions prepared in accordance with this invention are in a compact form. The ingredients are intimately mixed and then consolidated under pressure by molding or extrusion at ambient or elevated temperatures. Depending upon the particular composition and the desired density of the finished product, pressures up to 5,000 pounds per square inch and temperatures up to 212° F. can conveniently be used in molding the composition. Various types of conventional molding apparatus are suitable for this purpose. In some instances, it has been found that the addition of a solvent for the rubber binder assists in the incorporation of the binder throughout the gas generating charge. Solvents suitable for this purpose include hexane, heptane, cyclohexane, benzene, petroleum ether, and the like.

It has been found that the proportions of the various components must be kept within the stated limits to obtain a satisfactory gas-generating composition. For example, propellent compositions containing less than about 70% ammonium nitrate yield copious and objectionable amounts of smoke upon combustion whereas compositions containing more than about 80% ammonium nitrate are not suitable for gas-generators because of excessive flame temperatures.

Gas-generating propellants containing less than about 12% of rubber binder exhibit definite deficiencies in strength and other physical properties while those containing more than about 18% of the binder have an unfavorable oxygen balance. Although acrylic acid modified polybutadiene rubber is the preferred binder, other rubbers having like binding properties, such as butadiene copolymerized with one or more monomers such as acrylonitrile, styrene and vinylpyridine can also be used. Synthetic rubbers based on isobutylene and similar unsaturated hydrocarbons polymerizable to products of a rubbery nature, can likewise be employed.

Amounts of ballistic modifiers less than 2% have no appreciable effect on the characteristics of the gas generating composition. While amounts of modifier greater than about 10% could be used, compositions containing such increased proportions of the ballistic modifier show no particular advantage over those containing only about 10%. The ballistic modifiers used in the present gas-generating compositions are explosive compounds or compositions designed to control the burning rate and to enhance the ignitability of the composition. Suitable ballistic modifiers include guanidine nitrate, nitroguanidine, cyclotrimethylenetrinitramine, 2,4-dinitrophenoxyethanol, and the like.

Sodium barbiturate serves as a decomposition catalyst for the ammonium nitrate. Compositions containing less than 1% of this material do not give reliable results whereas increasing the percentage of sodium barbiturate above about 3% yields no additional advantages. In fact, if this material were present in proportions substantially greater than 3%, the excess portion would not serve any useful purpose but would merely act as a diluent. While the properties of the decomposition catalyst are improved by the additional of small percentages of carbon black, amounts of this material in excess of 3% serve no useful purpose. The coolant such as ammonium oxalate and the like, can be present in the composition in amounts up to about 6%. Larger proportions of the coolant would seriously impair the ignitability of the material.

This invention will be further clarified and more readily understood in view of the following embodiment which exemplifies practices that may be followed in carrying out tihs invention. All proportions are expressed in parts by weight.

*Example I*

Seventy-four parts of ammonium nitrate, 14 parts of acrylic acid modified polybutadiene rubber, 3 parts guanidine nitrate, 2 parts sodium barbiturate, 2 parts carbon black, and 5 parts ammonium oxalate were mixed at room temperature. When these materials were thoroughly mixed, the resultant mixture was transferred to molds where it was pressed at 5000 p.s.i. and 180° F. into cylindrical grains having an outside diameter and a length of about 5.5 inches and a centrally located perforation extending throughout the grain and having a diameter of about 1 inch. These gas generating charges had a density of about 0.053 pound per cubic inch and an average weight of about 7.75 pounds. Upon combustion they burned at a linear rate of approximately 0.075 inch per second at 1,000 p.s.i. with a flame temperature in the neighborhood of 2050° F.

*Example II*

Seventy-two parts ammonium nitrate, 16 parts butadiene-acrylic acid rubber, 8 parts nitroguanidine, 2 parts soduim barbiturate, and 2 parts carbon black were introduced into a sigmoid mixer and mixed at room temperature until a uniform mixture was obtained. The resultant mixture was transferred into molds and pressed at 5,000 p.s.i. and 212° F. into grains having the same dimensions as those of Example I. These molded charges had a linear burning rate of approximately 0.85 inch per second at 1,000 p.s.i. and produced a flame temperature of approximately 2150° F.

While the above embodiments describe consolidated charges having a particular shape and particular dimensions, it will be understood that the shape and size of such charges can vary widely and is dependent only upon the use for which the particular charge is designed. Furthermore, such charges may be provided with various types of surface inhibitors or coatings to control their burning rate, ignitability, or other characteristics.

Having thus described the invention, what is claimed is:

1. A consolidated gas-generating composition consisting essentially of between about 70% and about 80% ammonium nitrate in intimate mixture with a rubber binder, between about 2 percent and about 10 percent of a ballistic modifier selected from the group consisting of guanidine nitrate, nitroguanidine, cyclotrimethylenetrinitramine and 2,4-dinitrophenoxyethanol, and between about 1 percent and about 3 percent of sodium barbiturate.

2. A consolidated gas-generating composition which comprises between about 70% and about 80% ammonium nitrate, between about 12% and about 18% rubber binder, between about 2% and about 10% of a ballistic modifier selected from the group consisting of guanidine nitrate, nitroguanidine, cyclotrimethylenetrinitramine and 2,4-dinitrophenoxyethanol, and between about 1% and about 3% sodium barbiturate.

3. A consolidated gas-generating composition comprising between about 70% and about 80% ammonium nitrate in intimate mixture with between about 12% and about 18% rubber binder, between about 2% and about 10% of a ballistic modifier selected from the group consisting of guanidine nitrate, nitroguanidine, cyclotrimethylenetrinitramine and 2,4-dinitrophenoxyethanol, and between about 1% and about 3% sodium barbiturate.

4. A consolidated combustible gas-generating composition comprising between about 70% and about 80% ammonium nitrate in intimate mixture with between about 12% and about 18% rubber binder, between about 2% and about 10% of a ballistic modifier selected from the group consisting of guanidine nitrate, nitroguanidine, cyclotrimethylenetrinitramine and 2,4-dinitrophenoxyethanol, between about 1% and about 3% sodium barbiturate, up to about 3% carbon black, and up to about 6% ammonium oxalate.

5. A consolidated gas-generating composition consisting essentially of between about 70% and about 80% ammonium nitrate in intimate mixture with a rubber binder, between about 2 percent and about 10 percent of a ballistic modifier selected from the group consisting of guanidine nitrate, nitroguanidine, cyclotrimethylenetrinitramine and 2,4-dinitrophenoxyethanol, between about 1 percent and about 3 percent of sodium barbiturate, carbon black, and ammonium oxalate.

6. A consolidated combustible gas-generating composition comprising about 74% ammonium nitrate, about 14% modified polybutadiene rubber, about 3% guanidine nitrate, about 2% sodium barbiturate, about 2% carbon black and about 5% ammonium oxalate.

7. A consolidated gas-generating composition comprising between about 70% and about 80% ammonium nitrate in intimate mixture with between about 2% and about 10% of a ballistic modifier selected from the group consisting of guanidine nitrate, nitroguanidine, cyclotrimethylenetrinitramine, and 2,4-dinitrophenoxyethanol and between about 12% and about 18% of a copolymer of butadiene with a compound selected from the group consisting of acrylic acid, acrylonitrile, styrene and vinylpyridine.

8. A composition consisting essentially of about 15% of a rubber binder, about 70–80% of ammonium nitrate, 1–3% of sodium barbiturate and about 6% of dinitrophenoxyethanol.

References Cited in the file of this patent

UNITED STATES PATENTS

| 2,541,389 | Taylor | Feb. 13, 1951 |
| 2,941,876 | Mahan et al. | June 21, 1960 |
| 3,000,718 | Campbell | Sept. 19, 1961 |
| 3,003,861 | Reynolds et al. | Oct. 10, 1961 |
| 3,031,347 | Philipson | Apr. 24, 1962 |
| 3,068,129 | Schaffel | Dec. 11, 1962 |

FOREIGN PATENTS

| 21,529 of 1905 | Great Britain | Apr. 18, 1906 |
| 742,283 | Great Britain | Dec. 21, 1955 |